(12) United States Patent
Seremet et al.

(10) Patent No.: US 10,679,450 B2
(45) Date of Patent: Jun. 9, 2020

(54) LIGHT EMITTING DIODE CONTROL FOR CONTACT IMAGE SENSOR WITH DIGITIZED OUTPUT DATA

(71) Applicant: NCR Corporation, Duluth, GA (US)

(72) Inventors: Slavko Seremet, Kitchener (CA); Elsabe Coetzer, Waterloo (CA)

(73) Assignee: NCR Corporation, Atlanta, GA (US)

( * ) Notice: Subject to any disclaimer, the term of this patent is extended or adjusted under 35 U.S.C. 154(b) by 310 days.

(21) Appl. No.: 15/883,320

(22) Filed: Jan. 30, 2018

(65) Prior Publication Data

US 2019/0236885 A1 Aug. 1, 2019

(51) Int. Cl.
| | | |
|---|---|---|
| *G06K 9/20* | (2006.01) | |
| *G06T 7/00* | (2017.01) | |
| *G07D 7/12* | (2016.01) | |
| *H04N 1/031* | (2006.01) | |
| *G06K 9/00* | (2006.01) | |
| *G07D 7/121* | (2016.01) | |
| *H04N 5/268* | (2006.01) | |
| *H04N 5/30* | (2006.01) | |

(52) U.S. Cl.
CPC ............ *G07D 7/12* (2013.01); *G06K 9/00442* (2013.01); *G06K 9/209* (2013.01); *G06K 9/2027* (2013.01); *G06T 7/0002* (2013.01); *G07D 7/121* (2013.01); *H04N 1/031* (2013.01); *H04N 5/268* (2013.01); *H04N 5/30* (2013.01)

(58) Field of Classification Search
CPC .. G06K 9/00442; G06K 9/2027; G06K 9/209; G06T 7/0002; G07D 7/12; G07D 7/121; H04N 1/031; H04N 5/268; H04N 5/30
See application file for complete search history.

(56) References Cited

U.S. PATENT DOCUMENTS

| | | | | |
|---|---|---|---|---|
| 2009/0200477 | A1* | 8/2009 | Takabatake | H04N 1/0286 250/370.08 |
| 2010/0111489 | A1* | 5/2010 | Presler | H04N 5/232 386/278 |
| 2014/0192160 | A1* | 7/2014 | Chang | G06K 9/2036 348/46 |
| 2015/0348350 | A1* | 12/2015 | Collins, Jr. | G07D 7/20 382/135 |
| 2016/0163142 | A1* | 6/2016 | Auger | G07D 7/20 235/375 |
| 2018/0217258 | A1* | 8/2018 | Hirasawa | G01S 7/4817 |

* cited by examiner

*Primary Examiner* — Yubin Hung
(74) *Attorney, Agent, or Firm* — Schwegman, Lundberg & Woessner (57) ABSTRACT

A contact image sensor can illuminate a portion of a banknote with one or more light emitting diodes (LEDs), capture an image of the portion of the banknote with illumination reflected from or transmitted through the banknote, and generate a digital output signal that represents the captured image. A controller board can receive the digital output signal, generate one or more LED control signals, each LED control signal including changes in voltage to indicate times to switch a light emitting diode on or off, direct the one or more LED control signals to the contact image sensor, bypass digital LED control circuitry that is included with the contact image sensor, and switch the one or more LEDs in the contact image sensor on or off at the times indicated by the respective light emitting diode control signals.

20 Claims, 8 Drawing Sheets

FIG. 8

LIGHT EMITTING DIODE CONTROL FOR CONTACT IMAGE SENSOR WITH DIGITIZED OUTPUT DATA

TECHNICAL FIELD

The present disclosure relates to controlling light emitting diodes (LEDs) in a digital output contact image sensor.

BACKGROUND

High-throughput applications, such as banknote imaging and validation, can require precise triggering of light emitting diodes in a digital output contact image sensor. In some examples, the timing specifications can be more demanding than what can be provided by digital timing generators that are built into the digital output contact image sensor.

SUMMARY

In a first example, a system can include: a controller board configured to: receive a digital output signal from a contact image sensor; generate a light emitting diode control signal; direct the light emitting diode control signal to the contact image sensor; bypass digital light emitting diode control circuitry that is included with the contact image sensor; and switch a light emitting diode in the contact image sensor on or off at times indicated by the light emitting diode control signal.

In a second example, a system can include: a contact image sensor configured to: illuminate a portion of the banknote with a plurality of light emitting diodes; capture an image of the portion of the banknote with illumination reflected from or transmitted through the banknote; and generate a digital output signal that represents the captured image; a controller board configured to: receive the digital output signal from the contact image sensor; generate a plurality of light emitting diode control signals, each light emitting diode control signal including changes in voltage to indicate times to switch a light emitting diode on or off; direct the plurality of light emitting diode control signals to the contact image sensor; bypass digital light emitting diode control circuitry that is included with the contact image sensor; and switch the plurality of light emitting diodes in the contact image sensor on or off at the times indicated by the respective light emitting diode control signals.

In a third example, a method can include: generating a digital output signal representing an image of a portion of the banknote, using illumination from a light emitting diode included with a contact image sensor; receiving the digital output signal with a controller board, the controller board being separate from the contact image sensor; generating a light emitting diode control signal with the controller board, the light emitting diode control signal including changes in voltage to indicate times to switch the light emitting diode on or off; directing the light emitting diode control signal from the controller board to the contact image sensor; bypassing digital light emitting diode control circuitry that is included with the contact image sensor; and switching the light emitting diode on or off at the times indicated by the light emitting diode control signal.

BRIEF DESCRIPTION OF THE DRAWINGS

The present disclosure is illustrated by way of example and not limitation in the figures of the accompanying drawings, in which like reference numbers indicate similar elements.

It should be noted that elements in the drawings are not necessarily drawn to scale. The configurations shown in the drawings are merely examples, and should not be construed as limiting in any manner.

DETAILED DESCRIPTION

In order to address the relatively demanding light emitting diode timing requirements from high-throughput applications, such as banknote validation, a system can bypass digital LED control circuitry that is included with a contact image sensor, and instead control one or more light emitting diodes with LED control signals that are generated on a controller board separate from the contact image sensor. Such external control can offer more flexibility than the on-board control, and can optionally offer features such as allowing two or more differently-colored LEDs to be on at the same time, allowing all the LEDs to be off to allow sensors to return to their baseline levels, or allowing two or more differently-colored LEDs to have different resolutions in a scan direction.

In some examples, a contact image sensor can illuminate a portion of a banknote with one or more light emitting diodes (LEDs), capture an image of the portion of the banknote with illumination reflected from or transmitted through the banknote, and generate a digital output signal that represents the captured image. A controller board can receive the digital output signal, generate one or more LED control signals, each LED control signal including changes in voltage to indicate times to switch a light emitting diode on or off, direct the one or more LED control signals to the contact image sensor, bypass digital LED control circuitry that is included with the contact image sensor, and switch the one or more LEDs in the contact image sensor on or off at the times indicated by the respective light emitting diode control signals.

Figure 1:
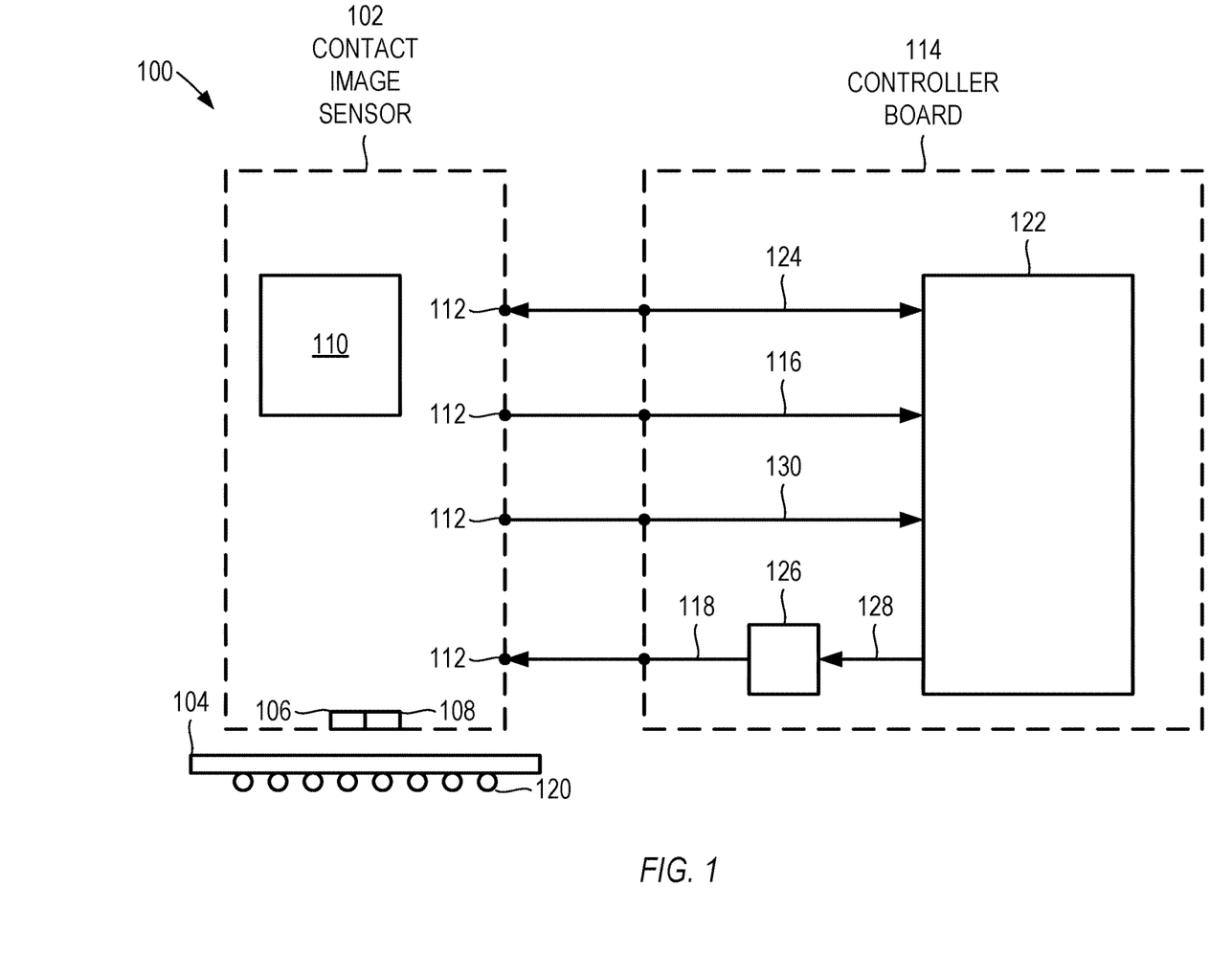
FIG. 1 shows an example of a system that can be used to validate banknotes, in accordance with some embodiments.

FIG. 1 shows an example of a system 100 that can be used to validate banknotes, in accordance with some embodiments. The system 100 can also be used for other functions, such as scanning documents. The system 100 is but one example of a system that can validate banknotes; other systems can also be used.

The system 100 can include a contact image sensor 102. The contact image sensor 102 can illuminate a portion of a banknote 104 with one or more light emitting diodes 106, capture an image of the portion of the banknote 104 with illumination reflected from or transmitted through the banknote 104, and generate a digital output signal 116 that represents the captured image.

In some examples, the contact image sensor 102 can include multiple detectors 108, with each detector 108 positioned to capture its own image of a corresponding portion of the banknote 104. Output signal circuitry in the contact image sensor 102 can stitch together signals from the detectors 108 to form a single digital output signal. In the configuration shown in FIG. 1, the contact image sensor 102 includes six detectors 108. In other examples, the contact image sensor 102 can include a single detector 108.

In some examples, the contact image sensor 102 can include multiple light emitting diodes 106. In these examples, the light emitting diodes 106 can have different wavelengths. In some of these examples, the plurality of light emitting diodes 106 can includes five light emitting diodes, with respective wavelengths in the red, green, blue, infrared, and ultraviolet portions of the electromagnetic spectrum. These are but examples; other colors or portions of the electromagnetic spectrum can also be used. In some examples, the contact image sensor 102 can include a set of light emitting diodes 106 for each detector 108. In other examples, the contact image sensor 102 can include multiple sets of light emitting diodes 106 to accommodate multiple detectors 108. In other examples, the contact image sensor 102 can include a single set of light emitting diodes 106 to accommodate multiple detectors 108.

In some examples, the contact image sensor 102 can include its own digital light emitting diode control circuitry 110. In some examples, the built-in digital light emitting diode control circuitry 110 may be inadequate for demanding or high-speed applications, such as banknote validation. To accommodate externally-generated light emitting diode control signals, the contact image sensor 102 can include one or more electrical contacts 112, such as terminals or pins, for each light emitting diode 106. A light emitting diode control signal applied to each contact (or pair of contacts) 112 can control a corresponding light emitting diode 106.

In some examples, the contact image sensor 102 can include additional electrical contacts 112, such as a two-way interface for a timing and control interface, and one or more pairs of contacts for a data interface. The data interface can include one or more pairs of low-voltage differential signaling data streams, and one or more clock pairs 130. In some examples, the data interface can be output-only, and can provide signals that can be received by elements external to the contact image sensor 102. The electrical contacts 112 from the contact image sensor 102 can connect to a controller board 114, separate from the contact image sensor 102.

The controller board 114 can receive the digital output signal 116 from the contact image sensor 102, generate one or more light emitting diode control signals 118, each light emitting diode control signal 118 including changes in voltage to indicate times to switch a light emitting diode on or off, direct the one or more light emitting diode control signals 118 to the contact image sensor 102, bypass the digital light emitting diode control circuitry 110 that is included with the contact image sensor 102, and switch one or more light emitting diodes 106 in the contact image sensor 102 on or off at the times indicated by the respective light emitting diode control signals 118.

In some examples, the change in voltage can include pulse width modulation, where the length of time that the LED is on can correspond to the amplitude of the received voltage level. For example, the contact image sensor 102 can receive reflected or transmitted light, convert the received light to a voltage, digitize the result, and output the digitized result to the controller board 114 using pulse width modulation.

In some examples, the controller board 114 can include circuitry to generate and receive the signals sent to and received from the contact image sensor 102. In some examples, the circuitry can include a processor, memory, and instructions stored in the memory that can be executed on the processor. In some examples, the circuitry can include one or more dedicated processors or chips, which can execute instructions that are hard-wired into the processors or chips. In some examples, the circuitry can receive, process, and/or generate video signals. In some examples, the circuitry can analyze the digital output signal that represents the captured image of the banknote, and determine whether the banknote is a valid banknote. In some examples, the circuitry can control an actuator 120 that feeds banknotes through the system, and controllably advances each banknote through a field of view of the contact image sensor in a direction orthogonal to a scan direction of the contact image sensor. The circuitry can be self-contained within the controller in a housing of the system 100, can be located on a server external to the housing and connected to the housing via a wireless or wired connection, or in a combination of internal and external locations.

In some examples, the controller board 114 is further configured to switch each light emitting diode 106 in the contact image sensor 102 on or off at a rate corresponding to a resolution in a scan direction, for each light emitting diode 106. In some examples, the resolutions in the scan direction for at least two of the light emitting diodes 106 are different from each other. In some examples, the contact image sensor 102 can include a scanner configured to scan light from the light emitting diode along a scan direction. In some examples, the actuator 120 can advance the banknote 104 along a direction orthogonal to the scan direction. In some examples, switching the light emitting diode on or off at the times indicated by the LED control signal 118 can correspond to a resolution in the scan direction. In some of these examples, a resolution of the image orthogonal to the scan direction can be finer than or equal to a resolution of the image along the scan direction. In some examples, a resolution of the image in the scan direction can be one of 200 dots per inch, 100 dots per inch, 50 dots per inch, 25 dots per inch, or another suitable value. In some examples, a resolution of the image orthogonal to the scan direction can 200 dots per inch, or another suitable value.

In some examples, a field programmable logic fabric 122 can be positioned on the controller board 114. The field programmable logic fabric 122 can include a field programmable gate array fabric, a system-on-a-chip programmable logic fabric, or another suitable programmable fabric. The field programmable logic fabric 122 can receive the digital output signal 116. The field programmable logic fabric 122 can further exchange timing and control data 124 with the contact image sensor 102. In some examples, the field programmable logic fabric 124 can directly generate the light emitting diode control signal. In other examples, such as the example shown in FIG. 1, a constant current circuit 126 positioned on the controller board 114 can generate the light emitting diode control signal 118 in response to timing instructions 128 from the field programmable logic fabric 122.

Figure 2:
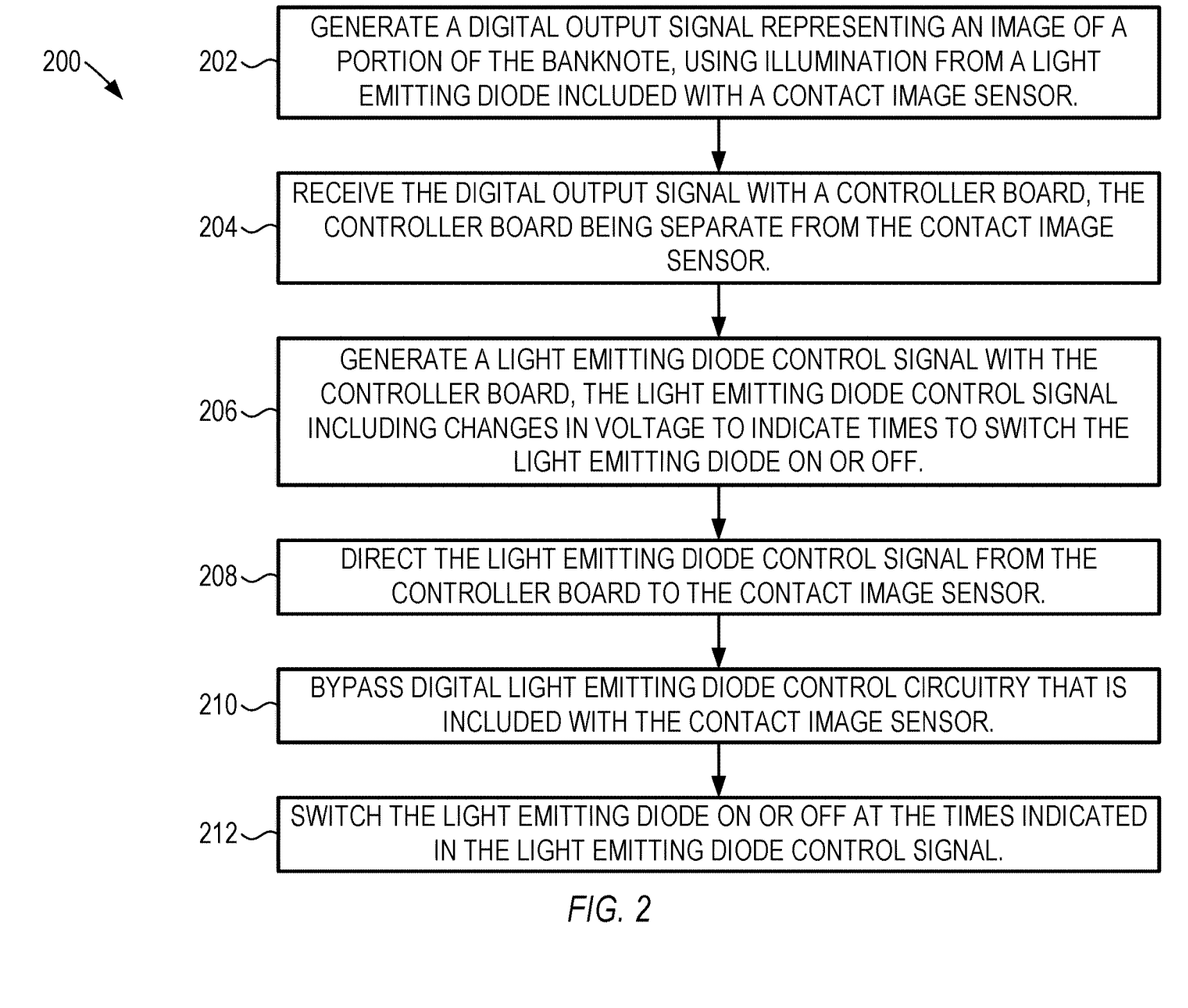
FIG. 2 shows an example of a method for controlling a light emitting diode, in accordance with some embodiments.

FIG. 2 shows an example of a method 200 for controlling a light emitting diode, in accordance with some embodiments. The method 200 can be executed by the system 100 of FIG. 1, by a suitable banknote validator, or by another suitable device. The method 200 is but one example of a method for controlling a light emitting diode; other suitable methods can also be used.

At operation 202, the system can generate a digital output signal representing an image of a portion of the banknote, using illumination from a light emitting diode included with a contact image sensor.

At operation 204, the system can receive the digital output signal with a controller board, the controller board being separate from the contact image sensor.

At operation 206, the system can generate a light emitting diode control signal with the controller board, the light emitting diode control signal including changes in voltage to indicate times to switch the light emitting diode on or off.

At operation 208, the system can direct the light emitting diode control signal from the controller board to the contact image sensor.

At operation 210, the system can bypass digital light emitting diode control circuitry that is included with the contact image sensor.

At operation 212, the system can switch the light emitting diode on or off at the times indicated by the light emitting diode control signal.

Figure 3:
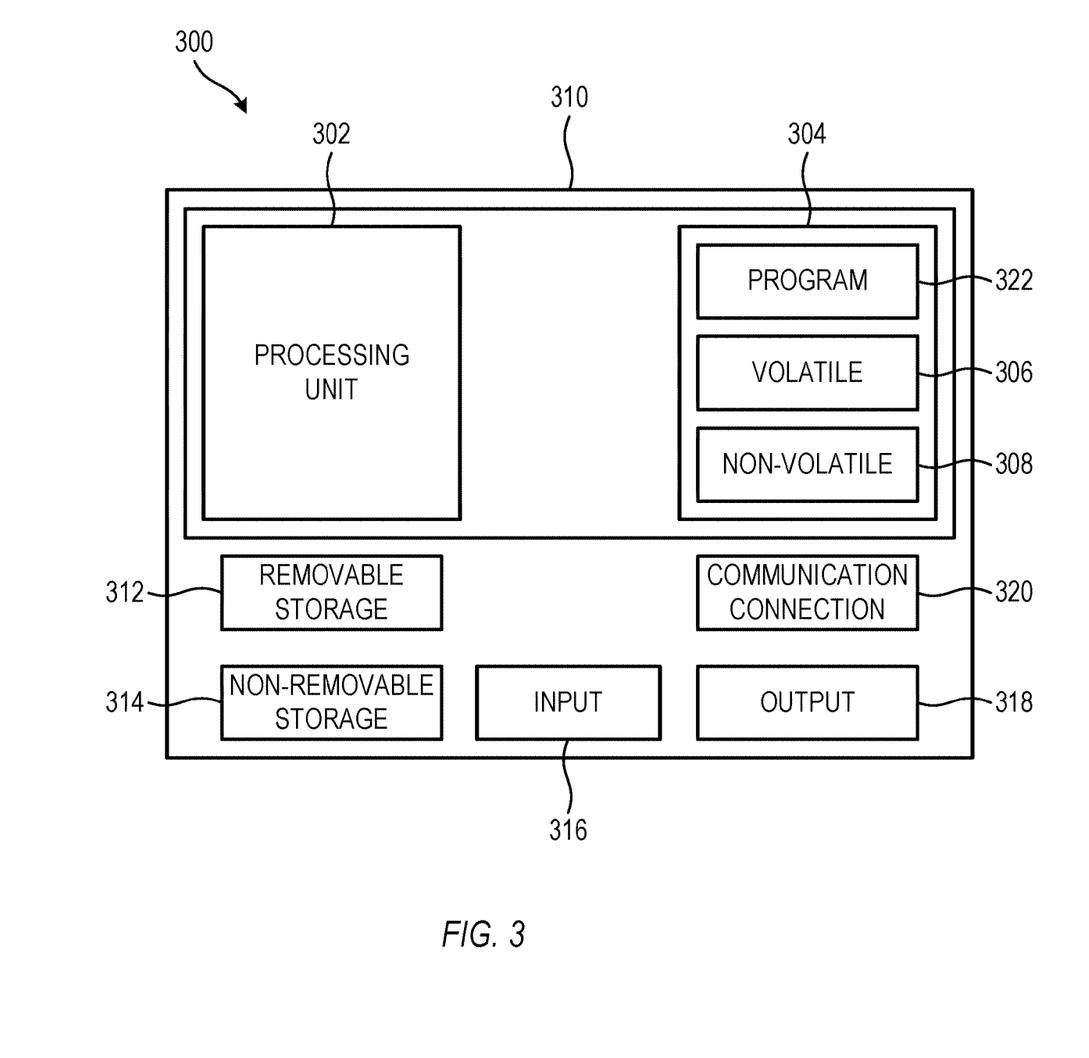
FIG. 3 shows a block diagram of an example of a module, such as a banknote validator, in accordance with some embodiments.

FIG. 3 shows a block diagram of an example of a module 300, such as a banknote validator, in accordance with some embodiments. The module 300 can include a system having a contact image sensor and a controller board, as well as an actuator, and other optional elements. The example of FIG. 3 is but one configuration for a module; other configurations can also be used.

In one embodiment, multiple such modules 300 are utilized in a distributed network to implement multiple components in a transaction based environment. An object-oriented, service-oriented, or other architecture may be used to implement such functions and communicate between the multiple modules 300 and components.

One example of a module 300, in the form of a computer 310, can include a processing unit 302, memory 304, removable storage 312, and non-removable storage 314. Memory 304 may include volatile memory 306 and non-volatile memory 308. Computer 310 may include, or have access to a computing environment that includes, a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318 (e.g., including output electrical signals that can indicate whether a particular banknote is valid), and a communication connection 320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 310. A hard drive, CD-ROM, and RAM are some examples of articles including a non-transitory computer-readable medium. For example, a computer program 322 with instructions for the computer 310, according to the teachings of the present disclosure, may be included on a CD-ROM and loaded from the CD-ROM to a hard drive. The computer-readable instructions allow computer 310 to provide generic access controls in a COM based computer network system having multiple users and servers.

Figure 4:
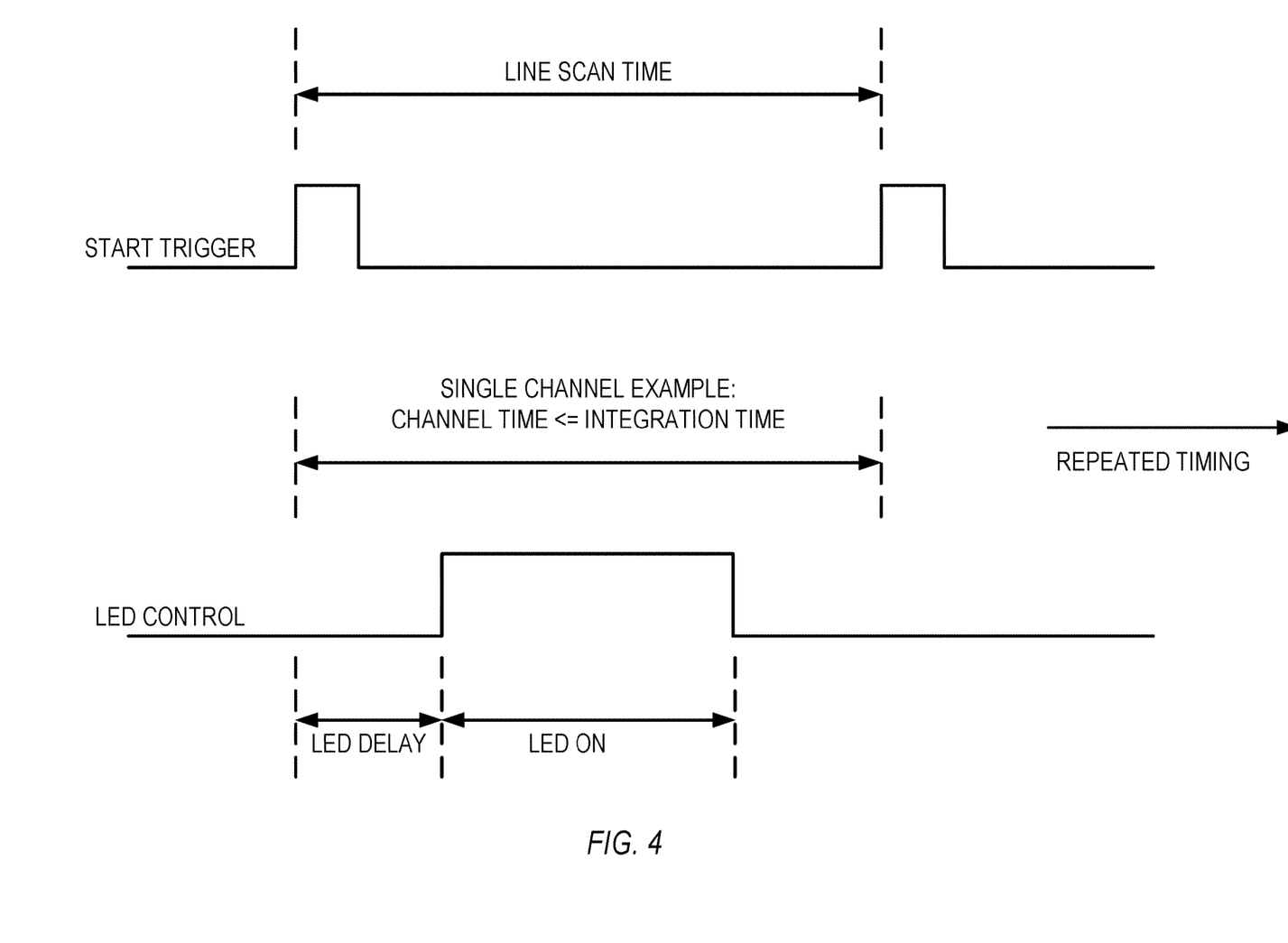
FIG. 4 shows an example of a light emitting diode control signal for a single channel, along with a start trigger signal, in accordance with some embodiments.

FIG. 4 shows an example of a light emitting diode control signal for a single channel, along with a start trigger signal, in accordance with some embodiments. The signals shown in FIG. 4 are merely examples, and other signals can also be used.

In a banknote scanner, or other scanning device, a line of the banknote is scanned, the banknote is advanced in a direction orthogonal to the scan direction, another line of the banknote is scanned, and so forth, until a desired portion of the banknote is fully imaged. Because the scanning procedure is repeated for each line, it will suffice to examine the scanning procedure for a single line.

In FIG. 4, and the figures that follow, the controller board can generate a start trigger signal to indicate the start of a new scan line. In some examples, the start trigger signal can toggle between two voltage levels, such as a relatively high voltage and a relatively low voltage, a positive voltage and zero volts, a negative voltage and zero volts, a positive voltage and a negative voltage, or another suitable voltage scheme. In the example of FIG. 4, the start of a new scan line is indicated by a rising edge of the start trigger signal, and the falling edge is not used. In other examples, the start of a new scan line can be indicated by a falling edge of the start trigger signal, and the rising edge is not used. Other trigger schemes are also possible, including using pulse width modulation instead of a rising edge and/or a falling edge.

The controller board can also generate a light emitting diode control signal to indicate when to turn on or turn off a particular light emitting diode in the contact image sensor. The light emitting diode control signal can also toggle between two voltage levels, such as a relatively high voltage and a relatively low voltage, a positive voltage and zero volts, a negative voltage and zero volts, a positive voltage and a negative voltage, or other suitable voltage scheme. In the example of FIG. 4, the rising edge of the light emitting diode control signal turns on the light emitting diode, and the falling edge of the light emitting diode control signal turns off the light emitting diode. In other examples, the rising edge of the light emitting diode control signal turns off the light emitting diode, and the falling edge of the light emitting diode control signal turns on the light emitting diode. Other trigger schemes are also possible.

In the example of FIG. 4, an LED delay time and an LED on time are two quantities that can be set by the controller board. Both of these quantities can be used to tailor the LED illumination to particular elements in a banknote. For example, the serial numbers of a banknote may have particular characteristics that are visible with one LED color but not another. The LED delay time and LED on time can be tailored to ensure that the banknote is illuminated with the desired LED color at a time corresponding to the serial numbers. This is but one example; other examples can also be used.

In the example of FIG. 4, the channel time (e.g., the total time for which the LED is on, and positioned anywhere within the channel time) is less than the integration time (e.g., the time it takes to scan one line of the banknote). For subsequent lines, the same values or different values can be used for the LED delay time and the LED on time.

Figure 5:
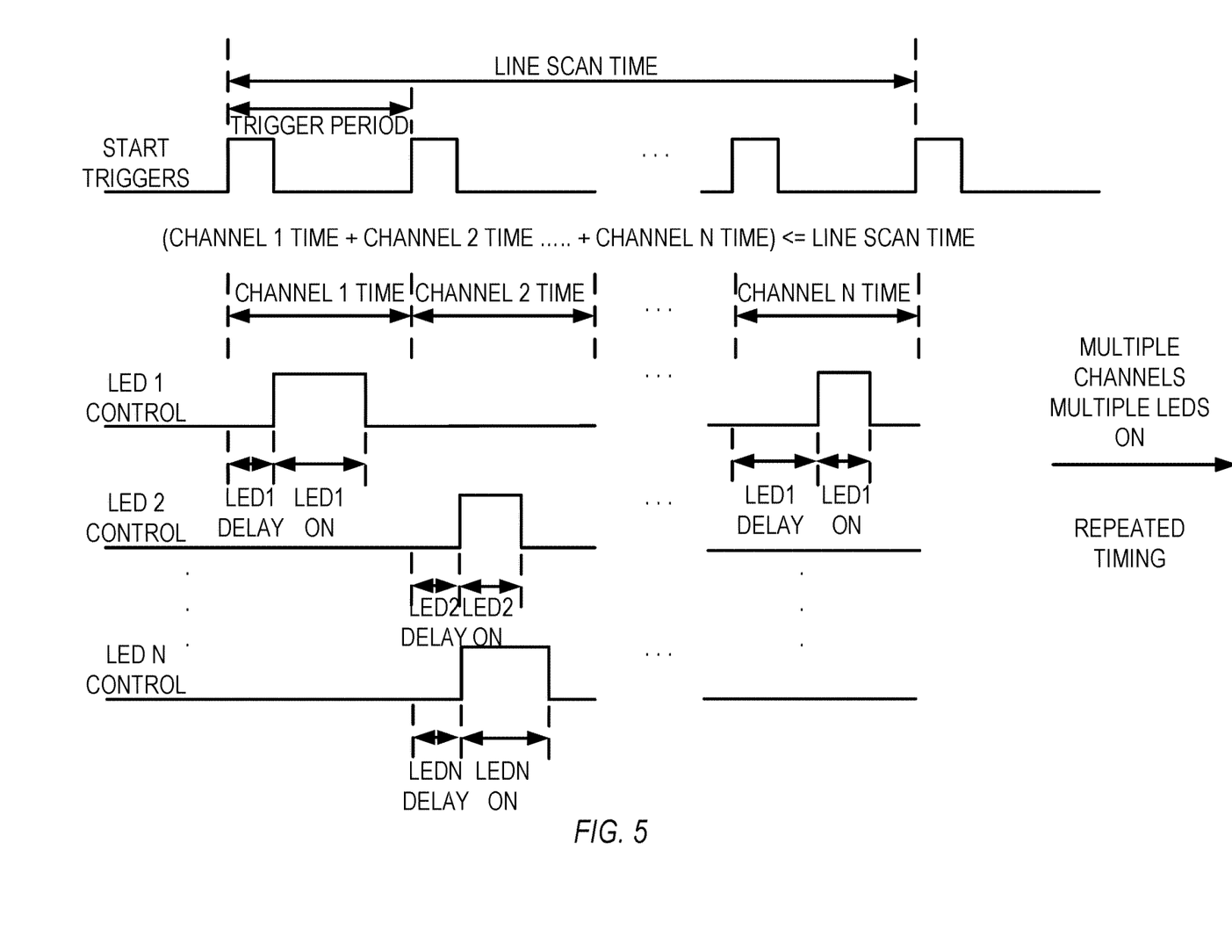
FIG. 5 shows an example of multiple light emitting diode control signals for multiple channels, along with a start trigger signal, in accordance with some embodiments.

FIG. 5 shows an example of multiple light emitting diode control signals for multiple channels, along with a start trigger signal, in accordance with some embodiments. The signals shown in FIG. 5 are merely examples, and other signals can also be used.

In the example of FIG. 5, the banknote scanner or other device includes multiple channels (numbering N), compared with the single channel shown in FIG. 4, and multiple LEDs (also numbering N), compared with the single LED shown in FIG. 4.

In the example of FIG. 5, in channel 1, LED 1 is on, while the other LEDs are off. In channel 2, LEDs 2 and N are on. In general, two or more LEDs can be on at a given time. In the example of FIG. 5, LEDs 2 and N are switched on at the same time (e.g., the values of the LED 2 delay and the LED N delay are equal), and are switched off at different times (e.g., the values of the LED 2 on time and the LED N on time are different).

In the example of FIG. 5, in channel N, LED 1 is on, with a different on time than in channel 1.

Figure 6:
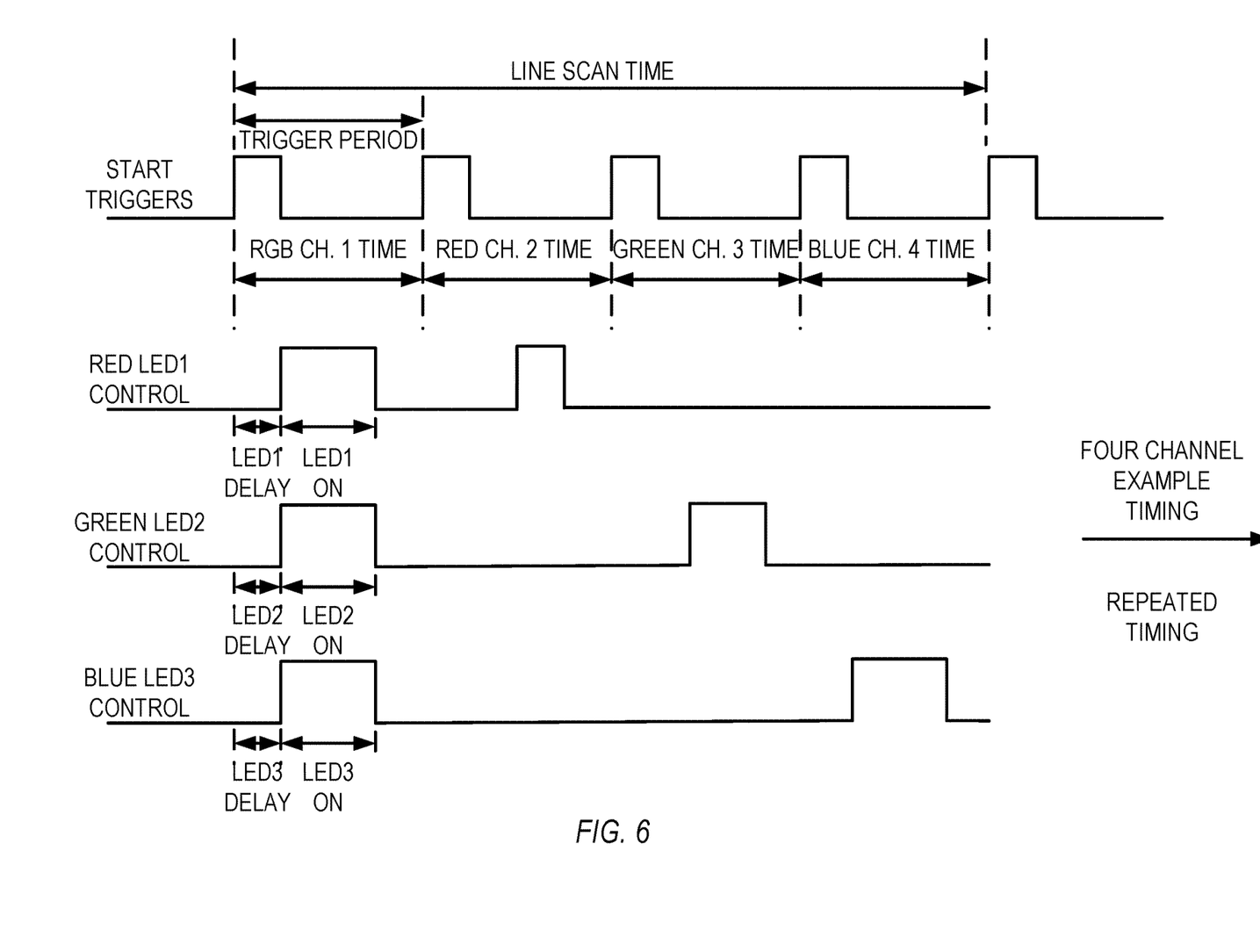
FIG. 6 shows another example of multiple light emitting diode control signals for multiple channels, along with a start trigger signal, in accordance with some embodiments.

FIG. 6 shows another example of multiple light emitting diode control signals for multiple channels, along with a start trigger signal, in accordance with some embodiments. The signals shown in FIG. 6 are merely examples, and other signals can also be used.

The signals shown in FIG. 6 are a special case of the signals of FIG. 5. Here, there are three LEDs, designated as red, green, and blue, and four channels, designated as RGB, red, green, and blue. In the RGB channel, all three LEDs turn on and off at the same time. In the red channel, only the red LED is on. In the green channel, only the green LED is on. In the blue channel, only the blue LED is on. In the example of FIG. 6, the on times of the red, green, and blue LEDs are all different from one another, which can lead to different scan line resolutions for red light, green light, and blue light.

Figure 7:
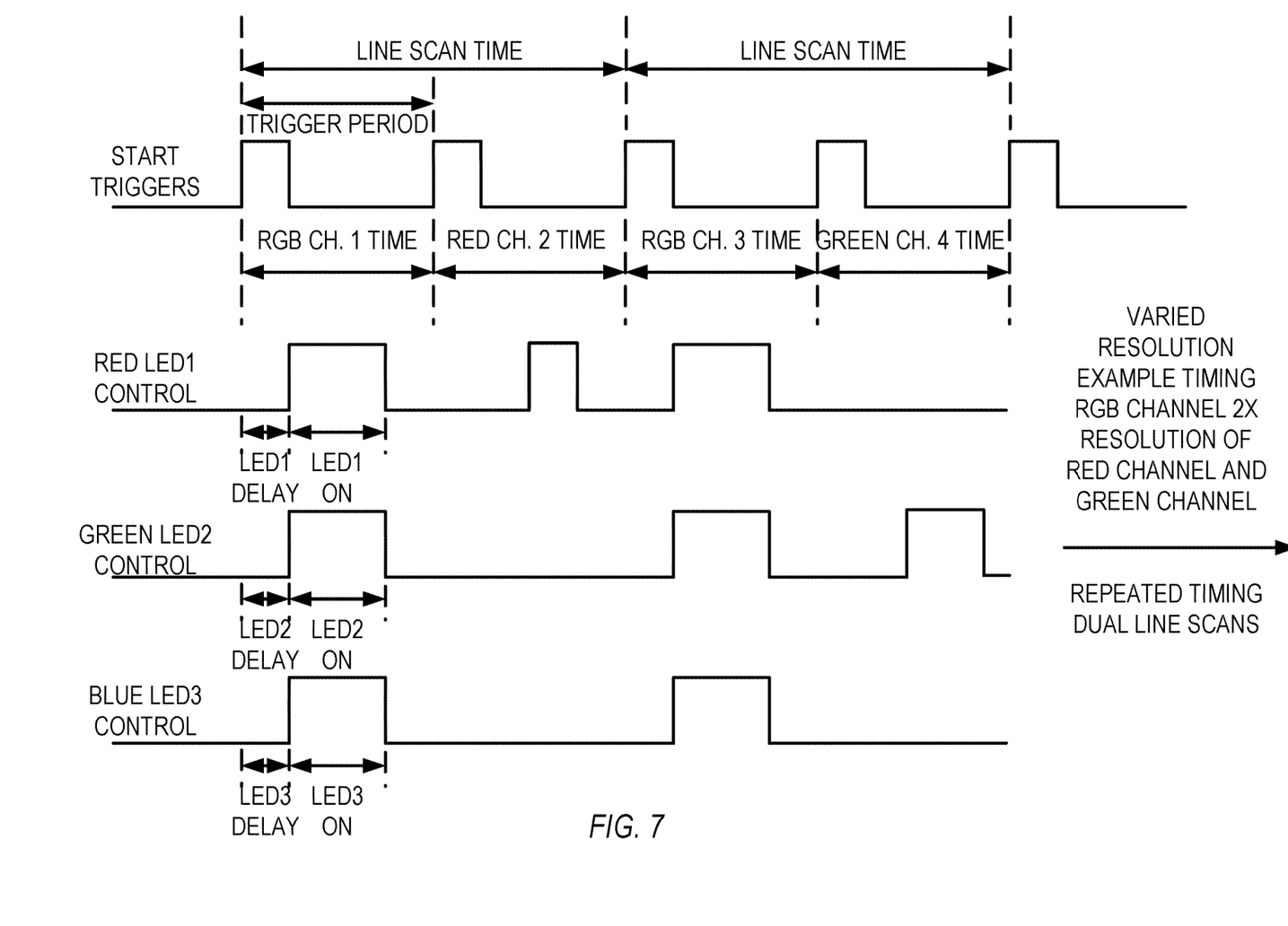
FIG. 7 shows another example of multiple light emitting diode control signals for multiple channels, along with a start trigger signal, in accordance with some embodiments.

FIG. 7 shows another example of multiple light emitting diode control signals for multiple channels, along with a start trigger signal, in accordance with some embodiments. The signals shown in FIG. 7 are merely examples, and other signals can also be used.

In the example of FIG. 7, there are three LEDs, designated as red, green, and blue. In the example of FIG. 7, there are four channels, designated as RGB, red, RGB, and green. In the RGB channels, the red, green, and blue LEDs are on. In the red channel, only the red LED is on. In the green channel, only the green LED is on. In this specific example, the RGB light can have twice the scan line resolution of the red and green lights.

Figure 8:
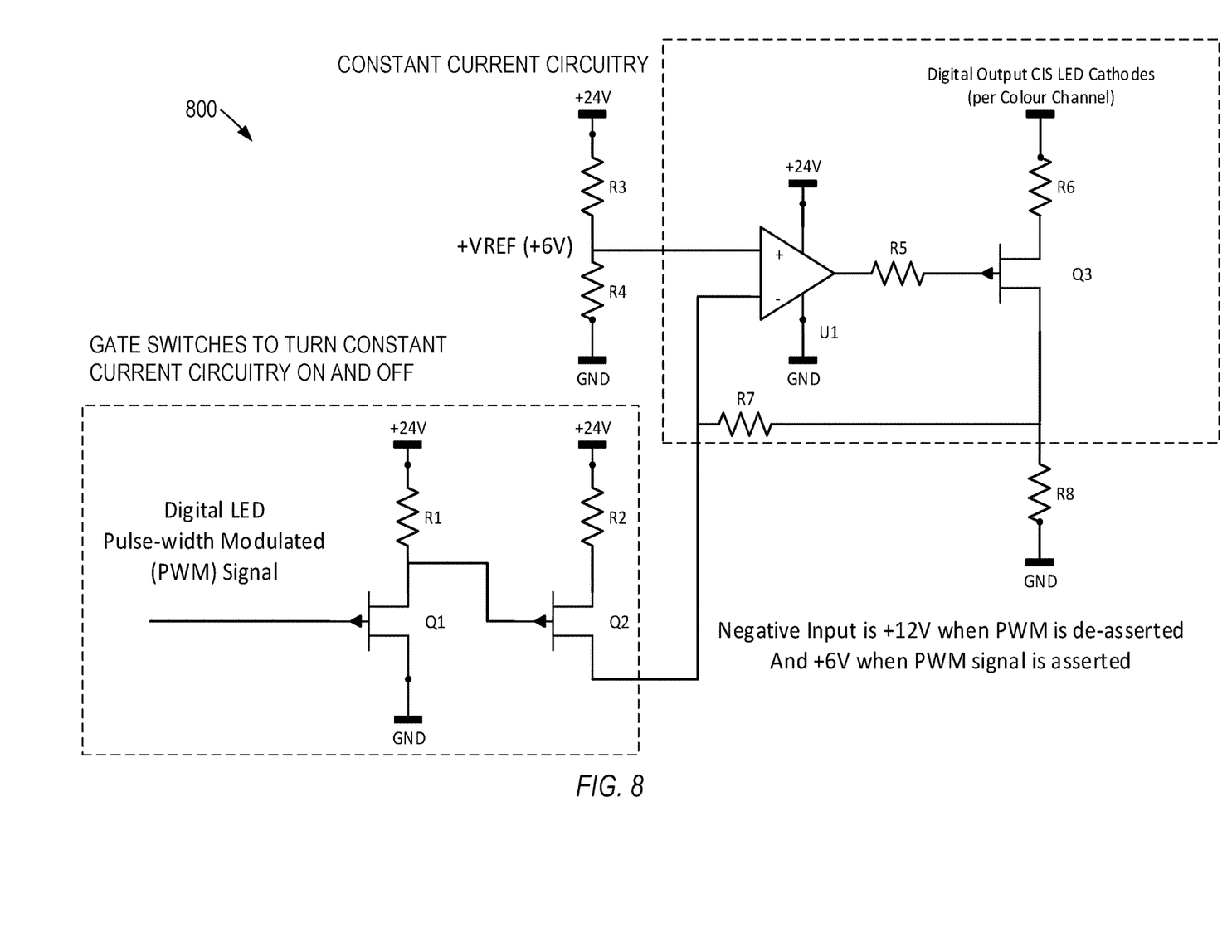
FIG. 8 shows an example of a constant current circuit, suitable for controlling the light emitting diode in response to input from the controller board, in accordance with some embodiments.

FIG. 8 shows an example of a constant current circuit 800, suitable for controlling the light emitting diodes in response to input from the controller board, in accordance with some embodiments. An upper right portion of FIG. 8 shows elements corresponding to the constant current circuitry. A lower left portion of FIG. 8 shows elements corresponding to the gates that switch to turn the constant current circuitry on and off. A negative input is +12 volts when a pulse-width modulated signal is de-asserted, and +6 volts when the pulse-width modulated signal is asserted. The circuit of FIG. 8 is but one example of a constant current circuit; other suitable circuits can also be used.

The following is a list of features that can optionally be included with any or all of the devices and systems discussed above. Each of these features can be included with any or all of the other features, except where noted.

In some examples, the systems, devices, and methods discussed herein can be used for note validation.

In some examples, the systems, devices, and methods discussed herein can include control circuitry located on a note validation module main controller board.

In some examples, the systems, devices, and methods discussed herein can include control circuitry that connects directly to digital contact image sensor terminals or pins, thereby bypassing timing generator LED control circuitry that is built into the digital contact image sensor.

In some examples, the systems, devices, and methods discussed herein can include programmable color selection, number of color channels per integration period, number of colors enabled per channel, each color LED(s) on time, and/or each color LED(s) delay time and sequencing.

In some examples, the systems, devices, and methods discussed herein can include red, green, blue, infrared and/or ultraviolet LED(s) integrated within a digital contact image sensor module.

In some examples, the systems, devices, and methods discussed herein can include reflective and/or transmissive imaging.

In some examples, the systems, devices, and methods discussed herein can include capturing different colors with different line scan resolutions for note validation in the scanning direction.

In some examples, the systems, devices, and methods discussed herein can include synchronization logic to capture, process and store digital contact image sensor module output data and clock stream(s).

In some examples, the systems, devices, and methods discussed herein can include synchronization logic decoding synchronization signal(s) embedded within multiple received digital contact image sensor output low-voltage differential signaling (LVDS) data stream(s).

In some examples, the systems, devices, and methods discussed herein can include multi-lane deserialization logic to capture multiple digital contact image sensor output low-voltage differential signaling (LVDS) data and clock stream(s). In other examples, the systems, devices, and methods discussed herein can include synchronization logic utilizing a synchronization output terminal/pin from the digital contact image sensor module.

In some examples, the systems, devices, and methods discussed herein can include control circuitry implemented within a field programmable gate array (FPGA) fabric or a system-on-a-chip (SoC) programmable logic (PL) fabric or similar programmable logic device.

In some examples, the systems, devices, and methods discussed herein can include control circuitry that is fully re-programmable.

In some examples, the systems, devices, and methods discussed herein can include control circuitry that is controlled by an embedded processor(s).

In some examples, the systems, devices, and methods discussed herein can include note validation with or without constant current driver circuitry.

In some examples, the systems, devices, and methods discussed herein can directly drive the LED cathode terminals/pins at a digital contact image sensor interface with a constant current circuit from the main validation controller board. In other examples, the systems, devices, and methods discussed herein can directly drive the LED cathode terminals/pins at a digital contact image sensor interface with digital outputs from the main validation controller board.

In some examples, the systems, devices, and methods discussed herein can directly power the LED anode terminals/pins at the digital contact image sensor interface from the main validation controller board.

In some examples, the systems, devices, and methods discussed herein can control the constant current LED driver circuitry with a digital pulse width modulated (PWM) signal from the advanced LED timing generator control logic.

In some examples, the systems, devices, and methods discussed herein can control the constant current LED driver circuitry with two field-effect transistors (FETs) operating in the saturation region (e.g., acting as logical switches) and a low-voltage digital pulse width modulated (PWM) signal.

In some examples, the systems, devices, and methods discussed herein can control the digital contact image sensor LED cathodes with a modified voltage follower circuit, consisting of an operational amplifier, a set positive input voltage, and a set negative input that has two voltage levels as controlled by the digital pulse width modulated (PWM) signal.

In some examples, the systems, devices, and methods discussed herein can control drive the digital contact image sensor LED cathodes at the maximum specified LED current using a set positive voltage reference that minimizes power dissipation.

What is claimed is:

1. A method, comprising:
   generating a digital output signal representing an image of a portion of the banknote, using illumination from a light emitting diode included with a contact image sensor;
   receiving the digital output signal with a controller board, the controller board being separate from the contact image sensor;
   generating a light emitting diode control signal with the controller board, the light emitting diode control signal including changes in voltage to indicate times to switch the light emitting diode on or off;
   directing the light emitting diode control signal from the controller board to the contact image sensor;
   bypassing digital light emitting diode control circuitry that is included with the contact image sensor; and
   switching the light emitting diode on or off at the times indicated by the light emitting diode control signal.

2. A system, comprising:
   a controller board configured to:
   receive a digital output signal from a contact image sensor;
   generate a light emitting diode control signal;
   direct the light emitting diode control signal to the contact image sensor;
   bypass digital light emitting diode control circuitry that is included with the contact image sensor; and
   switch a light emitting diode in the contact image sensor on or off at times indicated by the light emitting diode control signal.

3. The system of claim 1, wherein:
   the digital output signal represents an image of a portion of the banknote; and
   the light emitting diode is positioned to illuminate the portion of the banknote.

4. The system of claim 2, wherein the light emitting diode control signal includes changes in voltage to indicate the times to switch the light emitting diode on or off.

5. The system of claim 2, further comprising the contact image sensor.

6. The system of claim 5, further comprising a field programmable logic fabric positioned on the controller board, the field programmable logic fabric configured to receive the digital output signal, the field programmable logic fabric further configured to exchange timing and control data with the contact image sensor.

7. The system of claim 6, wherein the field programmable logic fabric is further configured to generate the light emitting diode control signal.

8. The system of claim 6, further comprising a constant current circuit positioned on the controller board, the constant current circuit configured to generate the light emitting diode control signal in response to timing instructions from the field programmable logic fabric.

9. The system of claim 5, wherein the contact image sensor includes:
   a detector positioned to capture an image of the portion of the banknote with illumination reflected from or transmitted through the banknote; and
   output signal generation circuitry to receive the captured image and generate the digital output signal.

10. The system of claim 5, wherein the digital output signal includes a low-voltage differential signaling data stream.

11. The system of claim 5, further comprising at least one processor positioned on the controller board and configured to validate the banknote in response to the digital output signal.

12. The system of claim 5, wherein the contact image sensor includes a scanner configured to scan light from the light emitting diode along a scan direction.

13. The system of claim 12, further comprising an actuator configured to advance the banknote along a direction orthogonal to the scan direction.

14. The system of claim 13, wherein:
   switching the light emitting diode on or off at the times indicated by the light emitting diode control signal corresponds to a resolution in the scan direction; and
   wherein a resolution of the image orthogonal to the scan direction is finer than or equal to a resolution of the image along the scan direction.

15. A system, comprising:
   a contact image sensor configured to:
   illuminate a portion of the banknote with a plurality of light emitting diodes;
   capture an image of the portion of the banknote with illumination reflected from or transmitted through the banknote; and
   generate a digital output signal that represents the captured image;
   a controller board configured to:
   receive the digital output signal from the contact image sensor;
   generate a plurality of light emitting diode control signals, each light emitting diode control signal including changes in voltage to indicate times to switch a light emitting diode on or off;
   direct the plurality of light emitting diode control signals to the contact image sensor;
   bypass digital light emitting diode control circuitry that is included with the contact image sensor; and
   switch the plurality of light emitting diodes in the contact image sensor on or off at the times indicated by the respective light emitting diode control signals.

16. The system of claim 15, wherein the plurality of light emitting diodes have different wavelengths.

17. The system of claim 16, wherein:
- the controller board is further configured to switch each light emitting diode in the contact image sensor on or off at a rate corresponding to a resolution in a scan direction, for each light emitting diode; and
- the resolutions in the scan direction for at least two of the light emitting diodes are different from each other.

18. The system of claim 15, further comprising a field programmable logic fabric positioned on the controller board, the field programmable logic fabric configured to receive the digital output signal, the field programmable logic fabric further configured to exchange timing and control data with the contact image sensor.

19. The system of claim 18, wherein the field programmable logic fabric is further configured to generate the light emitting diode control signal.

20. The system of claim 18, further comprising a constant current circuit positioned on the controller board, the constant current circuit configured to generate the light emitting diode control signal in response to timing instructions from the field programmable logic fabric.

* * * * *